United States Patent
Ramankutty et al.

(10) Patent No.: US 8,700,771 B1
(45) Date of Patent: Apr. 15, 2014

(54) SYSTEM AND METHOD FOR CACHING ACCESS RIGHTS

(75) Inventors: Rajesh Ramankutty, Nashua, NH (US); Sanil Kumar Puthiyandyil, Nashua, NH (US); Matthew H. Harper, Salem, NH (US)

(73) Assignee: Cisco Technology, Inc., San Jose, CA (US)

( * ) Notice: Subject to any disclaimer, the term of this patent is extended or adjusted under 35 U.S.C. 154(b) by 680 days.

(21) Appl. No.: 11/475,624

(22) Filed: Jun. 26, 2006

(51) Int. Cl.
*G06F 15/173* (2006.01)
*H04L 12/28* (2006.01)

(52) U.S. Cl.
USPC .......................................... 709/225; 370/389

(58) Field of Classification Search
USPC .................. 370/392, 389; 709/238, 219, 225; 726/1, 4, 13; 706/47
See application file for complete search history.

(56) References Cited

U.S. PATENT DOCUMENTS

| | | | | |
|---|---|---|---|---|
| 5,889,952 A * | 3/1999 | Hunnicutt et al. | ............. | 709/219 |
| 6,226,372 B1 * | 5/2001 | Beebe et al. | .................. | 379/189 |
| 6,463,474 B1 * | 10/2002 | Fuh et al. | ...................... | 709/225 |
| 6,529,897 B1 * | 3/2003 | Corl et al. | ............................. | 1/1 |
| 6,539,481 B1 * | 3/2003 | Takahashi et al. | ................. | 726/5 |
| 6,615,166 B1 * | 9/2003 | Guheen et al. | .................. | 703/27 |
| 6,636,502 B1 * | 10/2003 | Lager et al. | .................... | 370/352 |
| 6,876,653 B2 * | 4/2005 | Ambe et al. | ................ | 370/389 |
| 7,114,175 B2 * | 9/2006 | Lahteenmaki | .................... | 726/4 |
| 7,185,365 B2 * | 2/2007 | Tang et al. | ..................... | 726/13 |
| 7,246,372 B2 * | 7/2007 | Takahashi et al. | ................. | 726/3 |
| 7,254,562 B2 * | 8/2007 | Hsu et al. | ......................... | 705/77 |
| 7,308,703 B2 * | 12/2007 | Wright et al. | ..................... | 726/1 |
| 7,437,754 B2 * | 10/2008 | Desai et al. | ........................ | 726/4 |
| 7,724,740 B1 * | 5/2010 | Wang et al. | .................... | 370/392 |
| 7,894,480 B1 * | 2/2011 | Wang et al. | .................... | 370/474 |
| 2003/0028805 A1 * | 2/2003 | Lahteenmaki | ................ | 713/201 |
| 2003/0097446 A1 * | 5/2003 | Takahashi et al. | ............. | 709/226 |
| 2003/0120622 A1 * | 6/2003 | Nurmela et al. | ................ | 706/47 |
| 2003/0188192 A1 * | 10/2003 | Tang et al. | .................... | 713/201 |
| 2003/0191846 A1 | 10/2003 | Hunnicutt | | |
| 2003/0212905 A1 * | 11/2003 | Liu et al. | ........................ | 713/200 |
| 2004/0010473 A1 * | 1/2004 | Hsu et al. | ......................... | 705/77 |
| 2005/0076138 A1 * | 4/2005 | Sterne | ........................... | 709/238 |
| 2005/0086536 A1 | 4/2005 | Wu | | |
| 2005/0185917 A1 * | 8/2005 | Andrzej et al. | ................. | 386/46 |
| 2006/0034275 A1 * | 2/2006 | Roberts et al. | ................ | 370/389 |
| 2006/0090202 A1 * | 4/2006 | Liu et al. | ........................ | 726/17 |

(Continued)

OTHER PUBLICATIONS

Cisco Flexible Packet Matching Data Sheet, Oct. 27, 2005, Cisco Systems, pp. 1-5.*

*Primary Examiner* — Lynn Feild
*Assistant Examiner* — Michael A Chambers
(74) *Attorney, Agent, or Firm* — Wilmer Cutler Pickering Hale and Dorr LLP

(57) ABSTRACT

Systems and methods for caching information related to access rights are provided. The access rights may be rules stored in an access control list. The cache may include packet parameters against which packets in a data flow are matched to determine if a match is possible from the cache. If a match is possible, a corresponding rule is applied to the packet. If a match is not found in the cache, the access control list may be searched for a corresponding rule. The rule from the access control list may be populated into the cache when a match is found in the access control list.

27 Claims, 5 Drawing Sheets

(56) References Cited

U.S. PATENT DOCUMENTS

| | | | |
|---|---|---|---|
| 2006/0136570 A1* | 6/2006 | Pandya | 709/217 |
| 2006/0156018 A1* | 7/2006 | Lauer et al. | 713/182 |
| 2007/0121615 A1* | 5/2007 | Weill et al. | 370/389 |
| 2007/0156897 A1* | 7/2007 | Lim | 709/225 |
| 2007/0233957 A1 | 10/2007 | Lev-Ran et al. | |

* cited by examiner

SYSTEM AND METHOD FOR CACHING ACCESS RIGHTS

BACKGROUND OF THE INVENTION

The present invention relates to controlling a flow of data in a network. More particularly, information is cached and the data flow is compared against the cache before searching a set of rules that are used to control a data flow.

Wireless communication systems and networks are used in connection with many applications, including, for example, satellite communications systems, portable digital assistants (PDAs), laptop computers, and portable communication devices (e.g., cellular telephones). One significant benefit that users of such applications obtain is the ability to connect, or stay connected, to a network (e.g., the Internet) as long as the user is within range of such a wireless communication system.

Current wireless communication systems use either, or a combination of, circuit switching and packet switching in order to provide mobile data services to a mobile subscriber. Generally speaking, with circuit-based approaches, wireless data is carried by establishing a dedicated (and uninterrupted) connection between the sender and recipient of data using a series of circuits controlled by switches or exchanges. This direct connection is set up between the parties involved in a call by exchanging signaling messages which contain the parties' addresses and request the establishment of a physical switching path. Once the direct connection is set-up, it is maintained for as long as the sender and receiver have data to exchange. The establishment of such a direct and dedicated switching path results in a fixed share of network resources being tied up, with no one else being able to make use of them until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The data flow may include a number of packets or a single packet.

The packetized data flow is organized in many communication systems according to the International Standards Organization's Open System Interconnect Model. This model generally includes seven layers that are involved in the transmission of data. Layer 1 is a physical layer, layer 2 is a data link layer, layer 3 is a network layer, layer 4 is a transport layer, layer 5 is a session layer, layer 6 is a presentation layer, and layer 7 is an application layer. The application layer is the highest level and includes programs such as Microsoft Outlook email program. The lowest layer is the physical layer which encompasses details such as how information is transmitted on wires or through radio signals. A data flow can be packetized differently on the various layers when it is being transmitted.

Sometimes it is desirable to control a data flow. Rules generally denote something that can or cannot be done. An access control list is a set of rules that provides a way to determine the appropriate access rights a certain object should be allowed. Access control lists are typically used by operating systems to determine user access rights and are usually implemented in a data structure. The data structure is typically a table containing rules or entries that specify an individual user's or group's rights to specific system objects, such as a program, process, or a file. The access rights are usually whether a user can read from, write to, or execute an object.

In packet communications, an access control list is generally used to control access to ports and services that are available on a host, such as a router or server. The access control list is used to control both inbound and outbound traffic, and may be similar to a firewall or packet filter in some instances. However, when an access control list becomes lengthy, or when a data flow includes high packet data rates, delay is introduced because the list needs to be searched for each packet. In addition to delay, processing power is consumed by searching the list for the rules for each packet.

SUMMARY OF THE INVENTION

Systems and methods for caching information related to access rights are provided. The access rights may be rules stored in an access control list. The cache may include packet parameters which packets in a data flow are matched against to determine if a match is possible from the cache. In some embodiments, the cache may also include a rule corresponding to the packet parameters. In certain embodiments, more than one set of packet parameters are included in the cache. If a match is possible with packet parameters in the cache, a corresponding rule is applied to the packet. If a match is not found in the cache, the access control list may be searched for a corresponding rule. The rule from the access control list may be populated into the cache when a match is found in the access control list.

In accordance with the present invention, certain embodiments feature a system for providing wireless packet data service and controlling access rights on a data flow, the system including a mobile node, an access gateway, an access control list, and a cache. The access gateway is in communication with the mobile node. The access control list resides on a computer readable medium in the access gateway. The cache residing in the access gateway and storing at least one rule from the access control list. Further, header information from a packet is compared to the at least one rule stored in said cache to determine if there is a match.

Further in accordance with the present invention, certain embodiments feature a process for controlling access rights on a data flow, the process including inspecting at least one packet in a data flow for information, comparing the information against at least one rule stored in a cache, and when a match is found, applying an action associated with the at least one rule to the at least one packet.

Still further in accordance with the present invention, certain embodiments feature a system for communicating with a mobile node and controlling access rights on a data flow including a mechanism for providing a mobile node, a mechanism for communicating the data flow to the mobile node, a mechanism for providing an access control list residing on the means for communicating, and a mechanism for caching in communication with the means for providing an access control list and storing at least one rule from the device for providing the access control list. Further, header information from a packet is compared to the at least one rule stored in said cache to determine if there is a match.

BRIEF DESCRIPTION OF THE DRAWINGS

The above and other advantages of the present invention will be apparent upon consideration of the following detailed description, taken in conjunction with the accompanying drawings, in which like reference characters refer to like parts throughout, and in which.

DETAILED DESCRIPTION OF THE INVENTION

In accordance with the present invention, systems and methods for controlling a data flow in a communication system are provided. More particularly, a portion of an access control list that is used in controlling a data flow is cached. The present invention may be used in communication systems that provide for the transmission of a data flow. It is understood that certain features which are well known in the art are not described in detail in order to avoid complication of the subject matter of the present invention.

Figure 1:
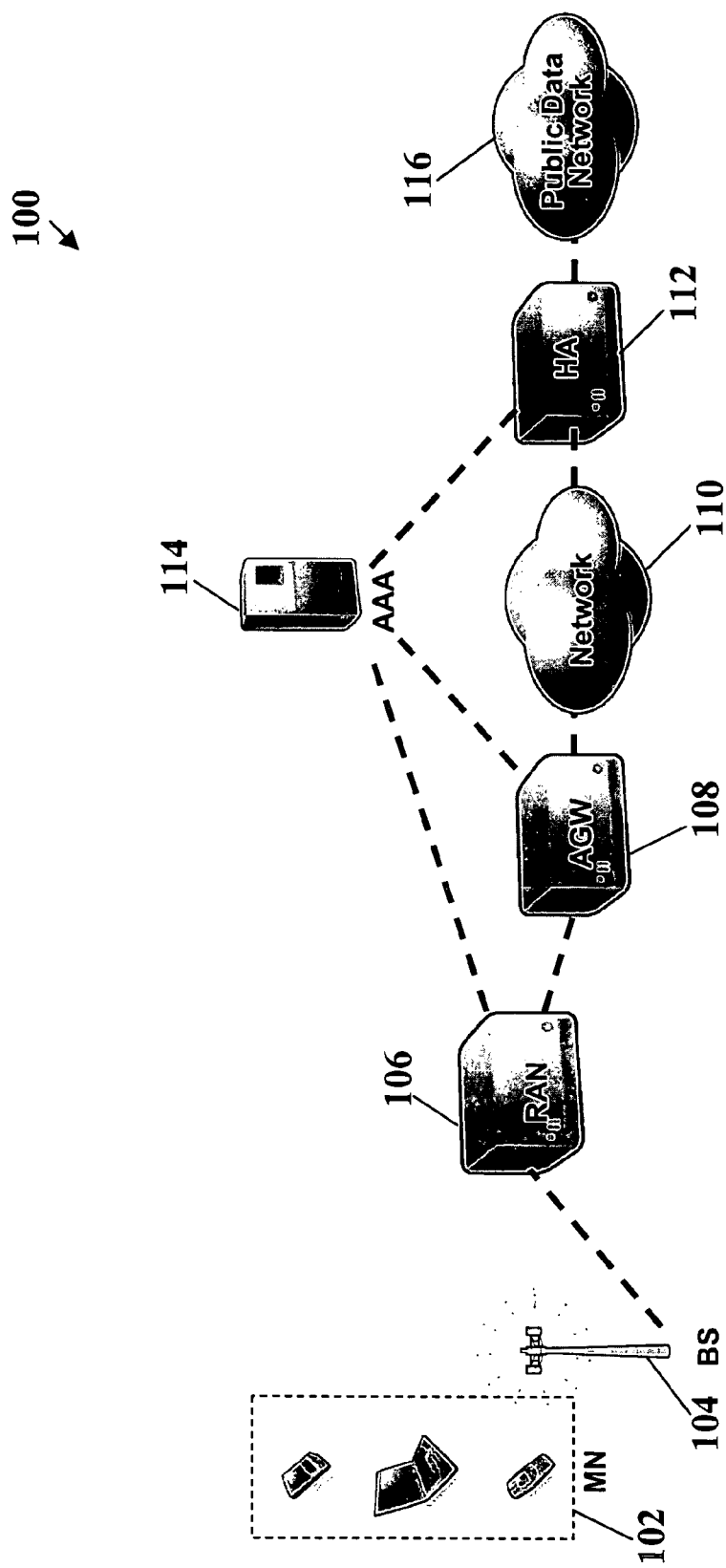
FIG. 1 is a schematic diagram of a network topology used for packet data transmissions in accordance with certain embodiments of the present invention.

FIG. 1 illustrates a network topology 100 in accordance with certain embodiments of the present invention. Network topology 100 includes a mobile node (MN) 102, a base station (BS) 104, a radio access network (RAN) 106, an access gateway (AGW) 108, a network 110, a home agent (HA) 112, an authentication, authorization, and accounting (AAA) server 114, and a public data network (PDN) 116. As may be appreciated by one practiced in the art, routers, servers and other pieces of networking and communication equipment may also be included in wireless data network 100 depending on the embodiment.

In wireless data network 100, mobile node 102 transmits and receives data wirelessly with base station 104. As shown, mobile node 102 can be a cell phone, a laptop, a personal digital assistant, or any other wireless data device. Base station 104 is coupled to RAN 106, which is also coupled to access gateway 108. The RAN equipment generally converts data into radio wave spectrum suitable for transmission by a base station to a mobile node and converts received radio wave spectrum information into data for forwarding to equipment such as an access gateway. Access gateway 108 is coupled to network 110 to communicate with home agent 112. Network 110 may include other telecommunications equipment such as routers. RAN 106, access gateway 108, and home agent 112 are coupled with AAA server 114.

The AAA server can determine whether to permit a mobile node to access network resources and can track the mobile node's network usage. Home agent 112 stores information about mobile node 102 and assists in routing data and completing requests from mobile node 102. Home agent 112 is coupled to public data network, which may be the internet, a local area network, a wide area network, a virtual private network, or any other network. In certain embodiments, access gateway 108 is a packet data serving node (PDSN) or a serving general packet radio service (GPRS) support node (also known as SGSN). If an SGSN is used, then a gateway general packet radio service (GPRS) support node (also known as GGSN) may be used in place of home agent 112.

Data flow access rights can be implemented with an access gateway 108, a PDSN, a SGSN, a GGSN, or a home agent. The access rights can be implemented in a rule based access control list and stored, at least in part as described below, in a cache. The access control list and cache may be implemented in software written in C, C++, C#, Perl, Java, or any other applicable computer language. In certain embodiments, the invention is implemented in hardware and software using random access memory or registers to store and to cache a list of rules that control access. The access control list may be implemented as a subscriber access control list that determines what actions are permitted for particular subscribers or groups of subscribers.

In some embodiments, there are five types of rules in the access control list. The type of rule is the action that occurs when the criteria of the rule are met. The first type of rule is permit, which allows a packet bearing certain criteria to continue to its destination. The second type of rule is deny, which prevents a packet from traveling further towards its destination and may cause the packet to be discarded. The third type of rule is redirect, which forwards the packet to a specified location. At this specified location, more processing or inspection may occur. The fourth type of rule is a readdress, where the packet's destination address and port information is changed according to the rule. The fifth type of rule is a log, which logs information from or about packets meeting the criteria specified in the access control list. Logging may also be performed in combination with other types of rules such as logging a denied packet.

Figure 2:
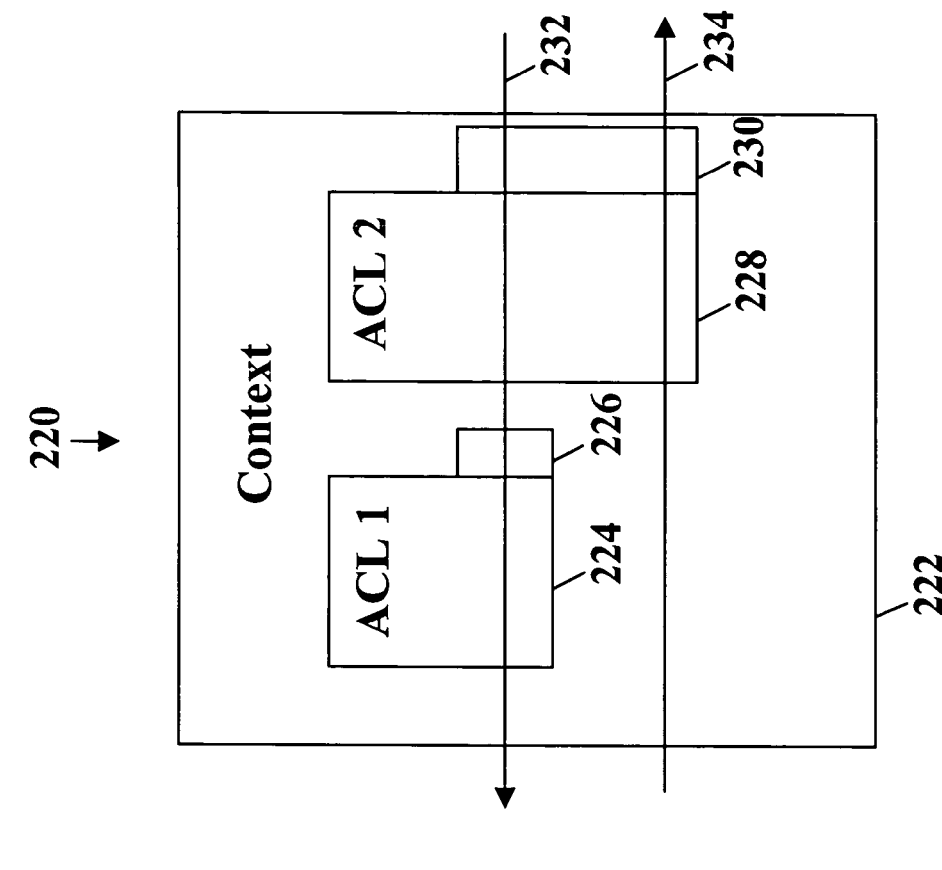
FIG. 2 is a schematic diagram of access control lists in a context in accordance with certain embodiments of the present invention.
Figure 2:
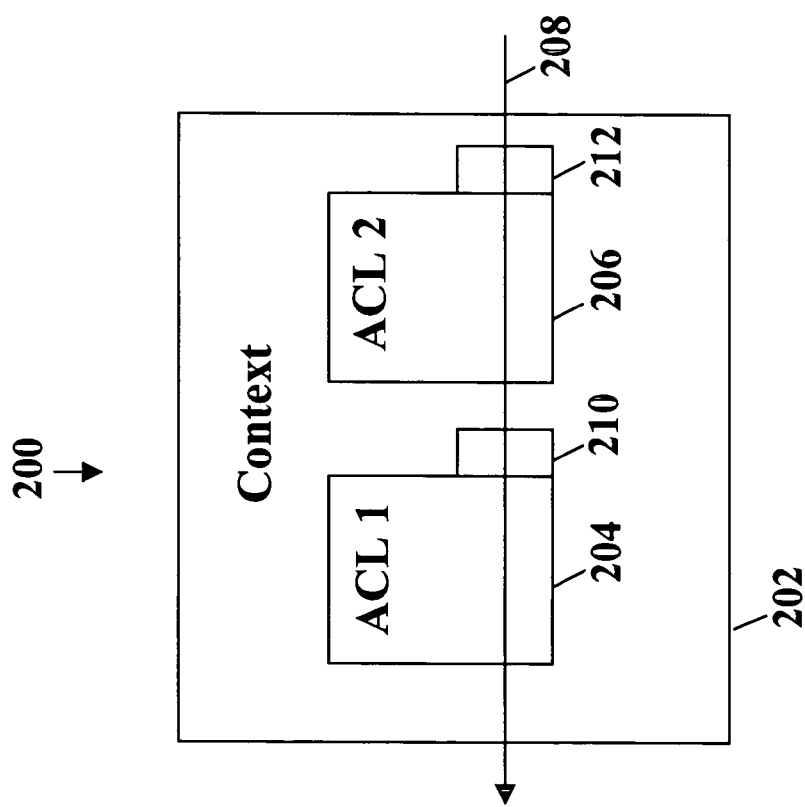

Depending on the embodiment, one or more access control lists may be created. The one or more access control lists may be created in a context. The context is a way of organizing one or more access control lists. FIG. 2 illustrates access control list setups 200 and 220 in accordance with certain embodiments of the present invention. Control list setup 200 includes a context 202, which further includes access control list (ACL) 1 204 and ACL 2 206. A data flow 208 runs through context 202, ACL 1 204, and ACL 2 206. This data flow is in packets and the packets can have different sources and destinations. Data flow 208 may also have a source and destination in the public data network. The access control lists in context 202 can be set up to perform different tasks. These tasks may include redirecting certain packets to another context if the packets are inbound in ACL 1 204 and readdressing packets destined for a particular user in ACL 2 206. The access control lists, ACL 1 204 and ACL 2 206, include caches 210 and 212 respectively. The caches are used when comparing packets from data flow 208. The caches may also be used to inspect the packets.

Control list setup 220 illustrates a second embodiment where a context 222 includes ACL 1 224, ACL 1 cache 226, ACL 2 228, ACL 2 cache 230, data flow 232, and reverse data flow 234. As illustrated, ACL 2 228 spans two data flows whose packets are moving in opposite directions. Both data flow 232 and reverse data flow 234 can carry packets to and from various sources and destinations. Access control list caching is also performed on the two data flows by cache 230. In some embodiments, access control lists compare packet header information from more than one data flow. Alternatively, the access control list may have a dedicated cache for each data flow.

Figure 3:
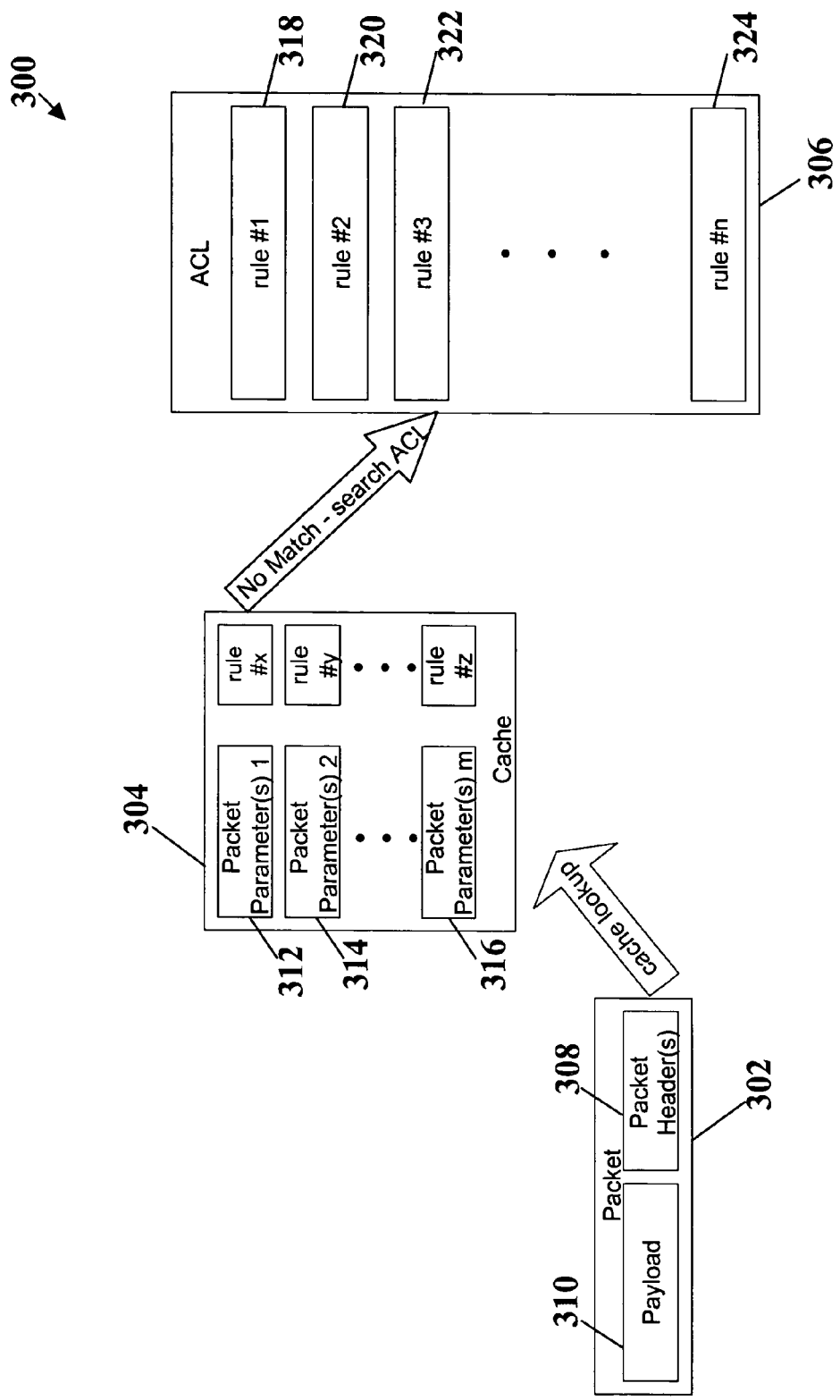
FIG. 3 is a schematic diagram of a process for caching an access control list in accordance with certain embodiments of the present invention.

FIG. 3 illustrates a process 300 for checking a data flow against an access control list in accordance with certain embodiments of the present invention. The process includes a packet 302, a cache 304, and an access control list 306. Packet 302 includes a packet header 308 and a payload 310. The packet header may be based on a standard protocol such as Internet Protocol 4 (IPv4), Internet Protocol 6 (IPv6), Point-to-Point Protocol (PPP), Ethernet, Asynchronous Transfer Mode (ATM), or any other applicable protocol. The access control list is independent of the type of packet header used because it may be setup to perform a specified action based on one or more packet header parameters. A packet header typically includes parameters such as destination information, packet length, source information, identification information, and other protocol defined fields. Payload 310 includes data or other information such as one or more encapsulated packets.

Illustrated cache 304 includes a set of packet parameters: parameter #1 312, parameter #2 314, and parameter #m 316. These packet parameters are one or more parameters from packet header 308 such as destination information, source information, and identification information. The packet parameters may be user selected or dynamically selected by a computer program. Cache 304 further includes a set of rules that describe the type of action to be performed on the packet such as permit, deny, redirect, readdress, or log. Each rule may correspond with a set of packet parameters. Packet parameter 1 312 corresponds with rule #x, packet parameter 314 corresponds with rule #y, and packet parameter 316 corresponds with rule #z. Rules x, y, and z further correspond to a rule in access control list 306.

Access control list 306 includes a set of rules: rule #1 318, rule #2 320, rule #3 322, and rule #n 324. Each rule includes types such as permit, deny, redirect, readdress, or log and criteria to determine if the rule applies. The criteria may be based on the packet header parameters and include wildcards and ranges for condition values. The rules in cache 304 are a subset of the rules in access control list 306. For example, rule #z may be the same as rule #1 318.

In some embodiments, cache 304 starts off empty with no parameters or any rules and fills up with rules as packets are inspected. The rules and packet parameters may be placed in cache 304 in a variety of ways. In one embodiment, cache 304 is populated using a least recently used entry method, which is similar to how a circular queue is populated. For example, a cache with four entries would sequentially populate so that when entry three is newly populated and entry four is the least recently used entry, entry four would be the next entry populated. In another embodiment, the population occurs through the use of timestamps, whereby the oldest timestamp is replaced by newest entry. In the timestamp process, cache 304 may be initialized so that the empty slots have timestamps set to a time older than current time. In yet another embodiment, the entries in the cache are ranked according to the number of times the rule is applied to the packet. In this ranking embodiment, packet parameters may not be used or may be selectively used. In certain embodiments, cache 304 may include packet parameters 312, 314, and 316 and pointers to or addresses of the corresponding rule in access control list 306.

Figure 4:
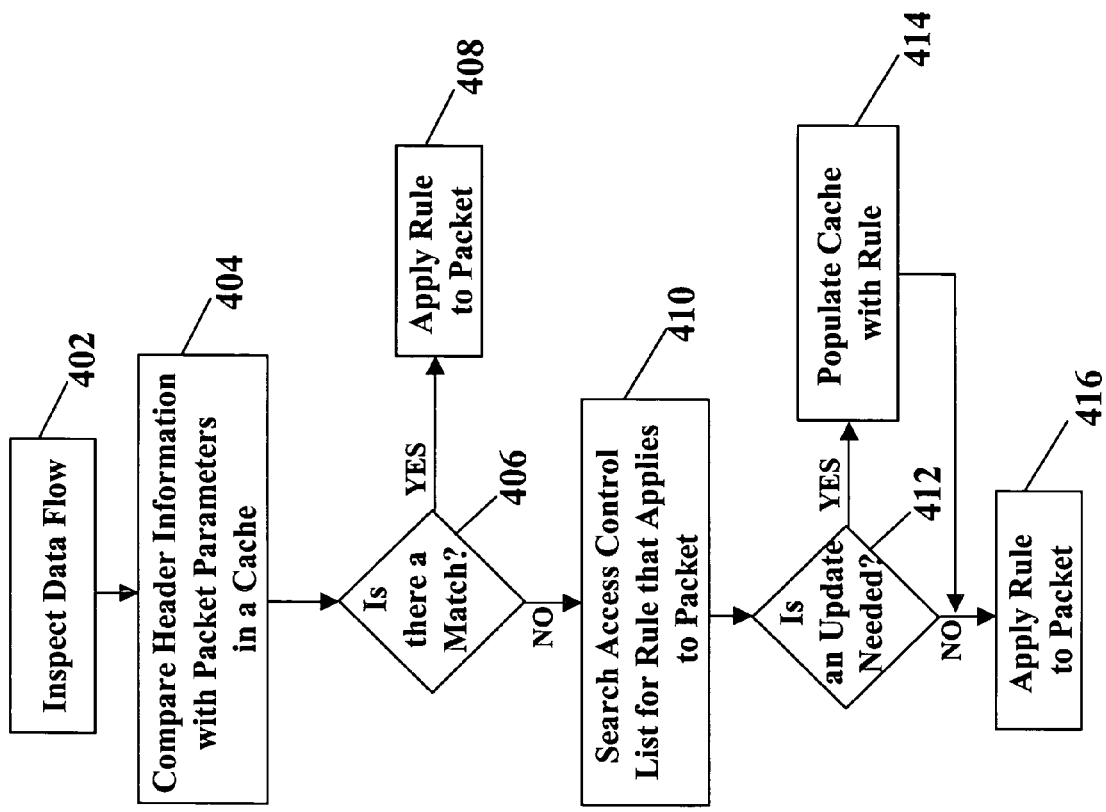
FIG. 4 is a flow diagram of caching an access control list in accordance with certain embodiments of the present invention.

FIG. 4 illustrates a flow diagram of an access control list caching process in accordance with certain embodiments of the present invention. The process begins at step 402 by inspecting the packet header. Step 402 can be an inspection where header information from a packet is parsed for information when a packet is received. In certain embodiments, packet information from layers 1-4 can be inspected, where the International Standards Organization's Open System Interconnect Model specifies each of the layers. Regardless of the layer in which the inspection occurs, information from the data flow is obtained in step 402.

The packet header information from step 402 is compared with packet parameters in the cache at step 404. The cached packet parameters may be portions of a packet header that are obtained from another packet header for which the rule criteria were met. If there is a match at step 406 between the packet header and one of the cached packet parameters, such as packet parameters 312 (FIG. 3) stored in the cache, a transition to step 408 occurs. In step 408, the rule corresponding to the cached packet parameters is applied to the packet from which the packet header originated. If there is no match at step 406, a transition to step 410 occurs and the access control list is searched for a rule that applies to the packet. When the rule is found, a determination is made whether a cache update is needed in step 412. In some embodiments, the cache is updated whenever the access control list is searched and a match is found. If a determination is made that the cache should be updated in step 412, there is a transition to step 414 where the cache is populated with the rule and with packet parameters from the packet header. The population of step 414 may be based on a least recently used method or a timestamp process. In other embodiments, cache updates can be determined differently. After the rule is found in step 410, the rule is applied to the packet in step 416.

In some embodiments of the present invention, the order of the rules in the access control list matters due to the scope of the rules. Thus, the rule that is the most narrow in scope (i.e., the rule matches the fewest number of packets when compared) is compared first and the last rule to be compared is the broadest in scope to catch the remaining packets that did not match on an earlier rule. In these embodiments, a packet may be able to match against more than one rule because of the increasing scope of the rules, so a search of the access control list begins with the narrowest rule and ends with the broadest rule. This can ensure a packet does not unexpectedly match against a more general rule. In other embodiments, a default rule can be set so the rule scope does not matter. With a default rule, if a search of the access control list does not yield a match, then the default rule is applied to the packet. The default rule can be implemented as an error exception when no match is found, as an if-then statement in the access control software program, or by any other applicable mechanism. If a packet does not match any of the rules in the access control list, then the default rule is applied.

The criteria of the rule are parameters that specify values or ranges of values that a packet should have in order to produce a match. Once considered a match, an action may be performed on the packet. These rule criteria may include packet parameter information such as source/destination information, source/destination port, IP address, Internet Control Message Protocol (ICMP) type, ICMP code, and protocol type. The criteria of the rule may be specified for the layer in which the data is inspected. For example, in a layer 2 protocol, such as point-to-point protocol, the data frame or packet includes an address, but not an IP address. Thus, the rule criteria of a layer 2 inspection and access control list can vary from the rule criteria of a layer 3 inspection. The criteria of the rule may be broadened by using wildcards, value ranges, and/or masks. Masking may be used on IP addresses to broaden which IP addresses meet the rule criteria.

Figure 5:
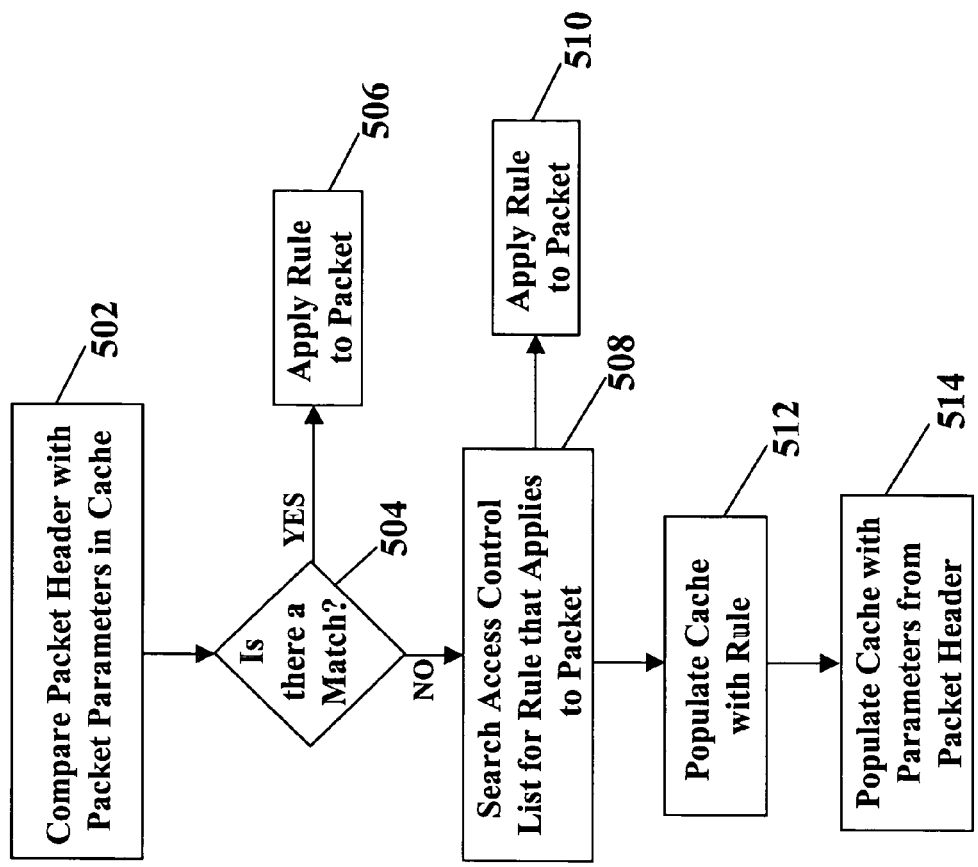
FIG. 5 is a flow diagram of a caching process for applying access rights to a data flow in accordance with certain embodiments of the present invention.

FIG. 5 illustrates a flow diagram of a caching process for applying access rights to a data flow in accordance with certain embodiments of the present invention. In some embodiments, the caching process includes a cache that includes packet parameters and rules. The cache may be implemented as a data structure, such as a table, of packet parameters and rules. In step 502, a packet header is compared with packet parameters that are in the cache. One or more fields of a packet header may be included as packet parameters. If the packet parameters match fields of the packet header in step 504, a corresponding rule associated with the parameters is applied to the packet in the data flow in step 506.

If no match is made from the packet parameters in the cache in step 504, a search of an access control list for a rule that applies to the packet is initiated in step 508. In certain embodiments of the present invention, multiple sets of packet parameters in the cache (e.g., packet parameters 1 312 through packet parameters m 316 of FIG. 3) are compared with the packet header to determine if there is a match before moving to step 508. When the search yields a rule that applies to the packet in step 508 (a match), the rule is applied to the packet in the data flow in step 510. The rule from the search of the access control list is placed into the cache overwriting another entry in the cache in step 512. In determining which entry to overwrite in the cache, a timestamp or a sequential process as described above may be used. In the sequential process the second entry may be overwritten after the first entry is overwritten and so on. In step 514, parameters from the packet header of the packet on which the access control list was conducted are placed in the cache in an entry corresponding to the matched rule. In some embodiments, the packet parameters matching the rule from the access control list rule search of step 508 are linked to the matching rule in the cache. The link may be a pointer, adjacent data cells in a data structure, or data structures addressed to the memory location of one another. The packet parameters may be used to ensure packets properly match against rules.

An example of why packet parameters are used in some embodiments is provided. If the access control list is composed of rules that are scoped so a search is completed from narrowest to broadest rule, the packet parameters can preserve the scoping in a cache where the search is not completed from narrowest to broadest rule. By using parameters that are narrower than the rule criteria, the subsequent packets in a data flow that are sent in a burst for the same purpose are able to match against the intended rule in the cache without the need for ordering the cache. In some embodiments, the cache may be an ordered cache where it is sorted or otherwise ordered after each cache population. The cache search may be directed by following a search order that is updated after each population. If a search order embodiment is implemented, the entries need not be in any particular order in the cache because the search order provides instructions on how to search the entries.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A system for communicating with a mobile node and controlling access rights on a data flow, the system comprising:
    an access gateway in communication with the mobile node;
    the access gateway having an access control list that includes a set of rules that are configured to filter packets to redirect some of the packets between the access gateway and the mobile node; and
    the access gateway further including a cache storing a copy of a subset of the access control list, the cache including at least one packet parameter associated with at least one rule that is configured to redirect some of the packets received by the access gateway;
    the access gateway responsive to receiving a packet, comparing header information from the packet to the at least one packet parameter stored in the cache to determine if there is a match between the header information and a packet parameter stored in the cache, and wherein,
        if there is a match in the cache between the header information and a packet parameter stored in the cache, implementing a rule associated with the packet parameters to redirect the packet, and
        if there is no match between the header information and a packet parameter stored in the cache, searching the access control list for an applicable rule and populating the cache with a packet parameter that matches the applicable rule.

2. The system of claim 1, wherein the cache includes packet parameters of the type provided in the header information of packets, and indexes to rules in the access control list.

3. The system of claim 1, wherein the access control list includes a first rule and a second rule, wherein the first rule is narrower than the second rule, and wherein the access gateway is configured to compare the header information of the packet to the first rule before comparing the header information of the packet to the second rule, and when the packet matches the first rule, the access gateway is further configured to populate the cache without comparing the header information to the second rule.

4. The system of claim 2, wherein the header information includes at least one of source information, destination information, a port number, and a protocol type.

5. The system of claim 1, wherein the cache is populated based on a least recently used entry method, and wherein previously cached data is overwritten in response to new data being written to the cache.

6. A method for controlling access rights with packet data comprising:
    inspecting a packet in a data flow for information;
    comparing the information against packet parameters stored in a cache and associated with a copy of a subset of access control rules to determine whether any of the subset of access control rules applies to the packet, wherein the access control rules are configured to redirect some of packets received by a gateway;
    when a match is found between the information and a packet parameter stored in the cache, applying an action associated with a rule that is associated with the packet parameter to the packet to redirect the packet;
    when no match is found between the information and a packet parameter stored in the cache,
        searching an access control list for an access control rule that applies to the information in the packet;
        identifying an access control rule that applies to the information in the packet;
        populating the cache with the packet parameter that matches the identified access control rule in the access control list; and
        overwriting previously stored data in the cache if the cache is already full.

7. The method of claim 6, wherein the comparing includes comparing information in a layer-3 packet.

8. The method of claim 6, wherein the overwriting is based on a timestamp.

9. The method of claim 6, wherein the overwriting is based on the least recently replaced entry in the cache.

10. The method of claim 6, wherein the access control list is stored in one or more of an access gateway, a packet data serving node, a home agent, a serving GPRS support node, and a gateway GPRS support node.

11. The method of claim 6, wherein the access control list includes a first rule and a second rule, wherein the first rule is narrower than the second rule, and wherein the method further comprises comparing the header information of the packet to the first rule before comparing the header information of the packet to the second rule, and when the packet matches the first rule, populating the cache with the first rule without comparing the header information to the second rule.

12. The method of claim 6, wherein the inspecting comprises inspecting information from a packet header.

13. The method of claim 6, wherein comparing the information comprises comparing at least one of source information, destination information, a port number, and a protocol type.

14. A system for communicating with a mobile node and controlling access rights on a data flow comprising:
means for communicating the data flow to the mobile node, the communicating means including an access control list having a set of access control rules that are configured to filter the data flow to redirect some of packets in the data flow; and
means for caching for data to access a subset of rules from the access control list, the cache including at least one packet parameter and a copy of the corresponding subset of rules that is configured to redirect some of the packets received by the system;
wherein the system compares header information from a packet to the at least one packet parameter stored in said caching means to determine if there is a match between the information and rules in the caching means, and
if there is no match, the system comparing the header information to the access control list for an applicable rule and populating the means for caching with a packet parameter associated with the applicable rule.

15. The system of claim 14, wherein the access control list is searched if there is no match in the cache.

16. The system of claim 15, wherein the means for caching is populated with packet parameters based on header information in packets and an index to corresponding rules in the access control list.

17. The system of claim 14, wherein the access control list includes a first rule and a second rule, wherein the first rule is narrower than the second rule, wherein the system is configured to compare the header information of the packet to the first rule before comparing the header information of the packet to the second rule, and when the packet matches the first rule, the system is further configured to populate the cache with the first rule without comparing the header information to the second rule.

18. The system of claim 14, wherein the header information includes at least one of source information, destination information, a port number, and a protocol type.

19. The system of claim 14, wherein the cache is populated based on a least recently used entry method and any previously cached data is overwritten.

20. A system for communicating with mobile nodes and controlling access rights on a data flow, the system comprising:

a network node in communication with mobile nodes for communicating with mobile nodes via data packets;
the network node having an access control list that includes a set of rules that are configured to filter the data packets to redirect some of the data packets between the network node and the mobile nodes;
the network node further including a cache for storing packet parameters and a copy of a portion of the rules in the access control list, the packet parameters being associated with rules that are configured to redirect some of the data packets received by the system;
the network node responsive to receiving a packet for comparing header information from the received packet to the packet parameters stored in the cache to determine if there is a match, and
if there is a match, implementing a rule corresponding to the matched packet parameters to redirect the received packet without accessing the access control list, and
if there is no match, searching the access control list for an applicable rule and populating the cache with a packet parameter that matches the applicable rule.

21. The system of claim 20, wherein the rules include at least three or more of the following:
(a) permit, which allows a packet bearing certain criteria to continue to its destination,
(b) deny, which prevents a packet from traveling further towards its destination,
(c) redirect, which forwards the packet to a specified location,
(d) readdress, where the packet's destination address and port information is changed according to the rule, and
(e) log, which logs information from or about packets meeting the criteria specified in the access control list.

22. The system of claim 20, wherein the rules include the following:
(a) permit, which allows a packet bearing certain criteria to continue to its destination,
(b) deny, which prevents a packet from traveling further towards its destination,
(c) redirect, which forwards the packet to a specified location,
(d) readdress, where the packet's destination address and port information is changed according to the rule, and
(e) log, which logs information from or about packets meeting the criteria specified in the access control list.

23. The system of claim 20, wherein the header information includes at least one of source information, destination information, a port number, and a protocol type.

24. The system of claim 20, wherein the network node includes at least one of an access gateway, a packet data serving node, a home agent, a serving general packet radio service (GPRS) support node, and a gateway GPRS support node.

25. The system of claim 20, wherein the access control list includes a first rule and a second rule, wherein the first rule is narrower than the second rule, wherein the network node is configured to compare the header information of the packet to the first rule before comparing the header information of the packet to the second rule, and when the packet matches the first rule, the network node is further configured to populate the cache with the first rule without comparing the header information to the second rule.

26. The system of claim 20, wherein the network node has a plurality of access control lists, each of which is associated with a respective cache.

27. The system of claim 20, wherein the cache is populated with packet parameters of the type provided in the header information of packets, and an index to a corresponding rule from the access control list.

* * * * *